US010510496B2

United States Patent
Kimura et al.

(10) Patent No.: US 10,510,496 B2
(45) Date of Patent: Dec. 17, 2019

(54) MULTILAYER CERAMIC CAPACITOR AND METHOD FOR MAKING MULTILAYER CERAMIC CAPACITOR

(71) Applicant: Murata Manufacturing Co., Ltd., Nagaokakyo-shi, Kyoto-fu (JP)

(72) Inventors: Masato Kimura, Nagaokakyo (JP); Yasuhiro Nishisaka, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/158,331

(22) Filed: Oct. 12, 2018

(65) Prior Publication Data

US 2019/0051467 A1  Feb. 14, 2019

Related U.S. Application Data

(62) Division of application No. 15/209,919, filed on Jul. 14, 2016, now Pat. No. 10,134,533.

(30) Foreign Application Priority Data

Jul. 16, 2015  (JP) .................................. 2015-142235

(51) Int. Cl.
*H01G 4/30* (2006.01)
*H01G 13/00* (2013.01)
(Continued)

(52) U.S. Cl.
CPC ......... *H01G 13/006* (2013.01); *H01G 4/0085* (2013.01); *H01G 4/2325* (2013.01); *H01G 4/30* (2013.01); *H01G 4/12* (2013.01)

(58) Field of Classification Search
CPC .......... H01G 4/30; H01G 4/008; H01G 4/012; H01G 4/12; H01G 4/248; H01G 4/1227; H01G 4/1209; H01G 4/129; H01G 4/228
See application file for complete search history.

(56) References Cited

U.S. PATENT DOCUMENTS

2001/0003362 A1* 6/2001 Sano ..................... B22F 1/0014
252/512
2006/0185474 A1* 8/2006 Yamada ................ B22F 1/0011
75/255

(Continued)

FOREIGN PATENT DOCUMENTS

| JP | 2004-311605 A | 11/2004 |
| JP | 2014-072522 A | 4/2014 |
| JP | 2015-035581 A | 2/2015 |

OTHER PUBLICATIONS

Kimura et al., "Multilayer Ceramic Capacitor and Method for Making Multilayer Ceramic Capacitor", U.S. Appl. No. 15/209,919, filed Jul. 14, 2016.

(Continued)

*Primary Examiner* — Nguyen T Ha
(74) *Attorney, Agent, or Firm* — Keating & Bennett, LLP (57) ABSTRACT

A multilayer ceramic capacitor includes a multilayer body that includes ceramic layers and inner conductor layers arranged in a stacking direction and that includes a first surface in which the inner conductor layers are exposed, and an outer electrode on the first surface of the multilayer body. The inner conductor layers contain Ni. The outer electrode includes a base layer that directly covers at least a portion of the first surface and is connected to the inner conductor layers. The base layer contains a metal and glass and includes a Ni diffusion portion connected to the inner conductor layers, the Ni diffusion portion containing Ni. A ratio of a diffusion depth of the Ni diffusion portion to a thickness of the base layer is smaller on two of the inner conductor layers that are located outermost than on other inner conductor layers.

3 Claims, 5 Drawing Sheets

(51) Int. Cl.
*H01G 4/008* (2006.01)
*H01G 4/232* (2006.01)
*H01G 4/12* (2006.01)

(56) References Cited

U.S. PATENT DOCUMENTS

| | | | |
|---|---|---|---|
| 2007/0297119 A1* | 12/2007 | Maegawa | H01G 4/232 |
| | | | 361/306.3 |
| 2013/0177471 A1* | 7/2013 | Kaneshiro | B22F 1/0014 |
| | | | 420/469 |
| 2014/0085770 A1 | 3/2014 | Park et al. | |
| 2015/0016018 A1 | 1/2015 | Onishi et al. | |
| 2015/0213959 A1* | 7/2015 | Omori | H01G 4/1227 |
| | | | 361/301.4 |

OTHER PUBLICATIONS

Official Communication issued Japanese Patent Application No. 2015-142235, dated Mar. 5, 2019.

* cited by examiner

LT CROSS SECTION

FIG. 4

LT CROSS SECTION

FIG. 5

LW CROSS SECTION

FIG. 6

LT CROSS SECTION

FIG. 7

WT CROSS SECTION

MULTILAYER CERAMIC CAPACITOR AND METHOD FOR MAKING MULTILAYER CERAMIC CAPACITOR

CROSS REFERENCE TO RELATED APPLICATIONS

This application claims the benefit of priority to Japanese Patent Application 2015-142235 filed Jul. 16, 2015, the entire contents of which application are hereby incorporated by reference.

BACKGROUND OF THE INVENTION

1. Field of the Invention

The present invention relates to a multilayer ceramic capacitor and a method for making a multilayer ceramic capacitor.

2. Description of the Related Art

A multilayer ceramic capacitor includes a multilayer body, which is obtained by alternately stacking dielectric ceramic layers and inner conductor layers and baking the resulting stack, and outer electrodes formed on surfaces of the multilayer body. With this structure, a small capacitor with a large capacitance can be obtained. Thus, this type of capacitor has been widely used in various fields with the increase in demand for mobile appliances, etc., in recent years.

The multilayer body includes a plurality of inner conductor layers. The inner conductor layers are exposed in the surfaces of the multilayer body and connected to outer electrodes. Each of the outer electrodes typically includes a base layer that directly covers some of the surfaces of the multilayer body and contains a metal and glass. The base layer is formed by applying a conductive paste to some of the surfaces of the multilayer body and baking the applied conductive paste. As disclosed in Japanese Patent No. 4300770, the metals that respectively constitute the inner conductor layers and the outer electrodes undergo interdiffusion to thereby bond the inner conductor layers to the outer electrodes. In other words, the metal contained in the inner conductor layers diffuses into the base layers of the outer electrodes, and, at the same time, the metal contained in the outer electrodes diffuses into the inner conductor layers.

In recent years, multilayer ceramic capacitors have become increasingly smaller. With such trends, there has been growing demand for outer electrodes with thinner base layers. It has been discovered that a multilayer ceramic capacitor that includes thin base layers and inner conductor layers containing Ni may experience a decrease in insulation resistance when Ni contained in the inner conductor layers diffuses into the base layers of the outer electrodes.

SUMMARY OF THE INVENTION

Preferred embodiments of the present invention provide a highly reliable multilayer ceramic capacitor that includes thin base layers, with which a decrease in insulation resistance of the multilayer ceramic capacitor is significantly reduced or prevented. A method for making the multilayer ceramic capacitor is also provided.

The inventors of preferred embodiments of the present invention have made a presumption that the decrease in insulation resistance possibly occurs when hydrogen is introduced into the multilayer body through Ni, which is a hydrogen storing metal. When a plating process is performed to form plating layers of the outer electrodes, hydrogen ions are generated due to the plating reaction. Nickel has an ability to store hydrogen ions. Thus, if Ni is diffused in the base layers, hydrogen ions are introduced into the multilayer body through Ni diffused in the base layers. Hydrogen ions introduced into the multilayer body gradually reduce the surrounding ceramic layers. As a result, a problem such as degradation of insulation resistance may arise.

The plating process is performed on a surface of the base layer. If the thickness of the base layer is small, it is highly possible that Ni is diffused in areas near the surfaces of the base layers. Thus, hydrogen ions may migrate from the surface on which the plating process is performed and reach Ni diffused in the base layer. As a result, hydrogen ions are easily introduced into Ni. If the thickness of the base layer is small, the distance from the surface on which the plating process is performed to a ceramic layer is short. Thus, hydrogen ions easily reach the ceramic layer.

Observation of a cross section of a multilayer ceramic capacitor shows that the thickness of the base layer is not even. In other words, the base layer is thickest at the center of the cross section and becomes relatively thinner toward outer side portions. In portions where the thickness of the base layer is relatively small, hydrogen ions easily reach outermost ceramic layers of the multilayer body since hydrogen ions are introduced into Ni diffused in the base layer. This is presumably the cause for a decrease insulation resistance.

The inventors of preferred embodiments of the present invention have discovered that when the Ni diffusion distance is controlled so that the Ni diffusion depth is not so large in the areas where the thickness of the base layer is particularly small, the amount of hydrogen ions introduced into Ni in these areas and reaching the ceramic layers is able to be decreased and the decrease in insulation resistance is able to prevented. Thus, preferred embodiments of the present invention have been conceived of and developed.

A multilayer ceramic capacitor according to a preferred embodiment of the present invention includes a multilayer body that includes a plurality of ceramic layers and a plurality of inner conductor layers arranged in a stacking direction and that includes a first surface in which the inner conductor layers are exposed; and an outer electrode disposed on the first surface of the multilayer body. The inner conductor layers contain Ni. The outer electrode includes a base layer that directly covers at least a portion of the first surface of the multilayer body and is connected to the inner conductor layers. The base layer is a layer containing a metal and glass and includes a Ni diffusion portion connected to the inner conductor layers, the Ni diffusion portion containing Ni. In a cross section of the multilayer body that intersects the first surface and extends along the stacking direction, when a measurement of the Ni diffusion portion taken from the first surface of the multilayer body in a direction perpendicular or substantially perpendicular to the first surface is assumed to be a diffusion depth of the Ni diffusion portion and a measurement of the base layer taken from the first surface of the multilayer body in the direction perpendicular or substantially perpendicular to the first surface is assumed to be a thickness of the base layer, an average ratio of the diffusion depth of the Ni diffusion portion to the thickness of the base layer measured on two outermost inner conductor layers located at two ends in the stacking direction among the inner conductor layers is smaller than an average ratio of the diffusion depth of the Ni diffusion portion to the thickness of the base layer measured on the inner conductor layers other than the two outermost inner conductor layers.

Preferably, in the multilayer ceramic capacitor described above, in a cross section of the multilayer body that intersects the first surface and extends in a direction perpendicular or substantially perpendicular to the stacking direction, when a measurement of the Ni diffusion portion taken from the first surface of the multilayer body in a direction perpendicular or substantially perpendicular to the first surface is assumed to be a diffusion depth of the Ni diffusion portion and a measurement of the base layer taken from the first surface of the multilayer body in a direction perpendicular or substantially perpendicular to the first surface is assumed to be a thickness of the base layer, an average ratio of the diffusion depth of the Ni diffusion portion to the thickness of the base layer measured on two ends, which are ends in a direction along the first surface, of the inner conductor layer closest to the cross section among the inner conductor layers is smaller than an average ratio of the diffusion depth of the Ni diffusion portion to the thickness of the base layer measured on a center portion, which is a center portion in the direction along the first surface, of the inner conductor layer closest to the cross section.

Preferably, in the multilayer ceramic capacitor described above, in the cross section of the multilayer that intersects the first surface and extends in a direction perpendicular or substantially perpendicular to the stacking direction, an average diffusion depth of the Ni diffusion layer measured on the two ends, which are ends in the direction along the first surface, of the inner conductor layer closest to the cross section among the inner conductor layers is smaller than a diffusion depth of the Ni diffusion portion measured on the center portion, which is the center portion in the direction along the first surface, of the inner conductor layer closest to the cross section. More preferably, in the cross section of the multilayer body that intersects the first surface and extends in a direction perpendicular or substantially perpendicular to the stacking direction, an average diffusion depth of the Ni diffusion portion measured on the two ends, which are ends in a direction along the first surface, of the inner conductor layer closest to the cross section among the inner conductor layers is about 54% or less of the diffusion depth of the Ni diffusion portion measured on the center portion, which is a center portion in the direction along the first surface, of the inner conductor layer closest to the cross section.

Preferably, in the multilayer ceramic capacitor, in the cross section of the multilayer body that intersects the first surface and extends along the stacking direction, an average diffusion depth of the Ni diffusion portion measured on the two outermost inner conductor layers is smaller than an average diffusion depth of the Ni diffusion portion measured on the inner conductor layers other than the two outermost inner conductor layers.

More preferably, in the cross section of the multilayer body that intersects the first surface and extends along the stacking direction, the average diffusion depth of the Ni diffusion portion measured on the two outermost inner conductor layers is about 54% or less of the average diffusion depth of the Ni diffusion portion measured on the inner conductor layers other than the two outermost inner conductor layers.

Preferably, in the multilayer ceramic capacitor described above, the Ni diffusion portion includes segments respectively connected to the inner conductor layers, and the segments are connected to the segments adjacent to one another.

Another preferred embodiment of the present invention provides a multilayer ceramic capacitor that includes a multilayer body that includes a plurality of ceramic layers and a plurality of inner conductor layers arranged in a stacking direction and that includes a first surface in which the inner conductor layers are exposed; and an outer electrode disposed on the first surface of the multilayer body. The inner conductor layers contain Ni. The outer electrode includes a base layer that directly covers at least a portion of the first surface of the multilayer body and is connected to the inner conductor layers. The base layer is a layer containing a metal and glass and includes a Ni diffusion portion connected to the inner conductor layers, the Ni diffusion portion containing Ni. In a cross section of the multilayer body that intersects the first surface and extends in a direction perpendicular or substantially perpendicular to the stacking direction, when a measurement of the Ni diffusion portion taken from the first surface of the multilayer body in a direction perpendicular or substantially perpendicular to the first surface is assumed to be a diffusion depth of the Ni diffusion portion and a measurement of the base layer taken from the first surface of the multilayer body in the direction perpendicular or substantially perpendicular to the first surface is assumed to be a thickness of the base layer, an average ratio of the diffusion depth of the Ni diffusion portion to the thickness of the base layer measured on two ends, which are ends in a direction along the first surface, of the inner conductor layer closest to the cross section among the inner conductor layers is smaller than the ratio of the diffusion depth of the Ni diffusion portion to the thickness of the base layer measured on a center portion, which is a center portion in the direction along the first surface, of the inner conductor layer closest to the cross section.

Preferably, in the multilayer ceramic capacitor described above, in the cross section of the multilayer body that intersects the first surface and extends in a direction perpendicular or substantially perpendicular to the stacking direction, an average diffusion depth of the Ni diffusion portion measured on the two ends, which are ends in a direction along the first surface, of the inner conductor layer closest to the cross section among the inner conductor layers is smaller than a diffusion depth of the Ni diffusion portion measured on the center portion, which is a center portion in the direction along the first surface, of the inner conductor layer closest to the cross section. More preferably, in the cross section of the multilayer body that intersects the first surface and extends in a direction perpendicular or substantially perpendicular to the stacking direction, the average diffusion depth of the Ni diffusion portion measured on the two ends, which are ends in a direction along the first surface, of the inner conductor layer closest to the cross section among the inner conductor layers is about 54% or less of the diffusion depth of the Ni diffusion portion measured on the center portion, which is a center portion in the direction along the first surface, of the inner conductor layer closest to the cross section.

For various preferred embodiments of the multilayer ceramic capacitor of the present invention, the Ni diffusion portion is preferably a portion within the base layer and having a Ni content of about 25% or more provided that a Ni content at an interface between the inner conductor layer and the base layer is 100%.

For various preferred embodiments of the multilayer ceramic capacitor of the present invention, the base layer preferably contains Cu, each of the inner conductor layers preferably includes a Cu diffusion portion in contact with the base layer and containing Cu, and in the cross section of the multilayer body that intersects the first surface and extends along the stacking direction or the cross section of the multilayer body that intersects the first surface and extends in a direction perpendicular or substantially perpendicular to the stacking direction, when a measurement of the Cu diffusion portion taken from the first surface of the multilayer body in a direction perpendicular or substantially perpendicular to the first surface is assumed to be a diffusion depth of the Cu diffusion portion, a diffusion depth of the Ni diffusion portion of one of the inner conductor layer is preferably smaller than a diffusion depth of the Cu diffusion portion of the same inner conductor layer.

For various preferred embodiments of the multilayer ceramic capacitor of the present invention, the Cu diffusion portion is preferably a portion within the inner conductor layer and having a Cu content of about 25% or more provided that a Cu content at an interface between the inner conductor layer and the base layer is 100%.

For various preferred embodiments of the multilayer ceramic capacitor of the present invention, a maximum diffusion depth of the Ni diffusion portion is preferably about 2.5% or more and about 33.3% or less of a maximum thickness of the base layer.

For various preferred embodiments of the multilayer ceramic capacitor of the present invention, the outer electrode preferably includes a Ni plating layer and a Sn plating layer on the base layer.

Another preferred embodiment of the present invention provides a method for making a multilayer ceramic capacitor. The method includes a step of applying a conductive paste containing Cu powder to a first surface of a multilayer body that includes a plurality of ceramic layers and a plurality of inner conductor layers arranged in a stacking direction, the first surface exposing the inner conductor layers; and a step of baking the conductive paste on the first surface. The Cu powder has an average particle diameter of about 0.5 μm or more and about 2.0 μm or less, and in the step of baking the conductive paste, water is added to a baking atmosphere while a peak temperature is maintained.

In the method for making a multilayer ceramic capacitor described above, in the step of baking the conductive paste, water is preferably added in a later stage of a period during which the peak temperature is maintained.

In the method for making a multilayer ceramic capacitor described above, the conductive paste preferably further contains glass, and the average particle diameter of the Cu powder is preferably smaller than an average particle diameter of the glass.

According to some preferred embodiments of the present invention, a decrease in insulation resistance of a multilayer ceramic capacitor that includes a thin base layer is significantly reduced or prevented, and a highly reliable multilayer ceramic capacitor and a method for making such a capacitor are provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Multilayer ceramic capacitors according to various preferred embodiments of the present invention and methods for making multilayer ceramic capacitors according to various other preferred embodiments of the present invention will now be described with reference to the drawings. The present invention is not limited by the structures described below and is subject to alterations and modifications without departing from the scope of the present invention. A combination of two or more preferable features of the present invention described below is also within the range of the present invention.

Figure 1:
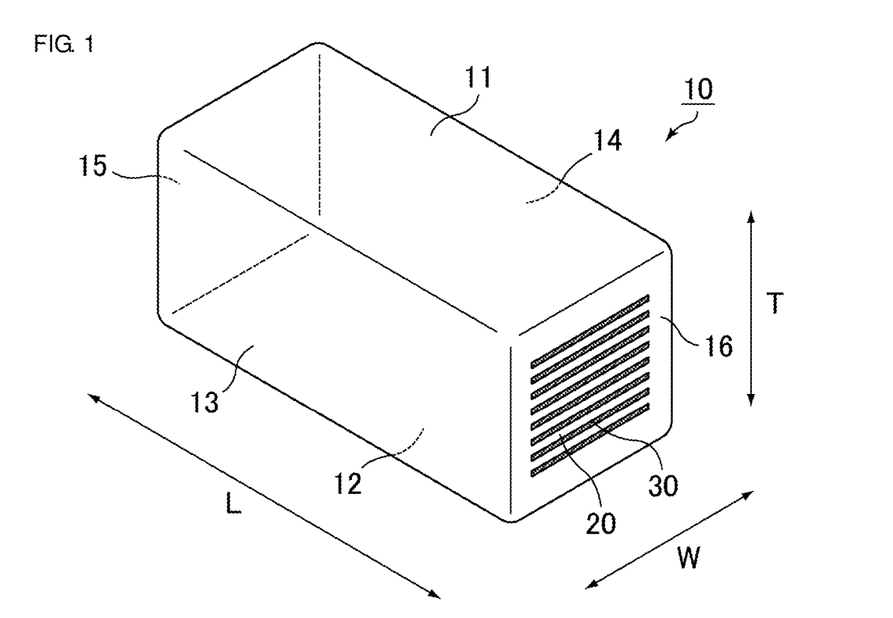
FIG. 1 is a schematic perspective view of one example of a multilayer body of a multilayer ceramic capacitor according to a preferred embodiment of the present invention.
Figure 2:
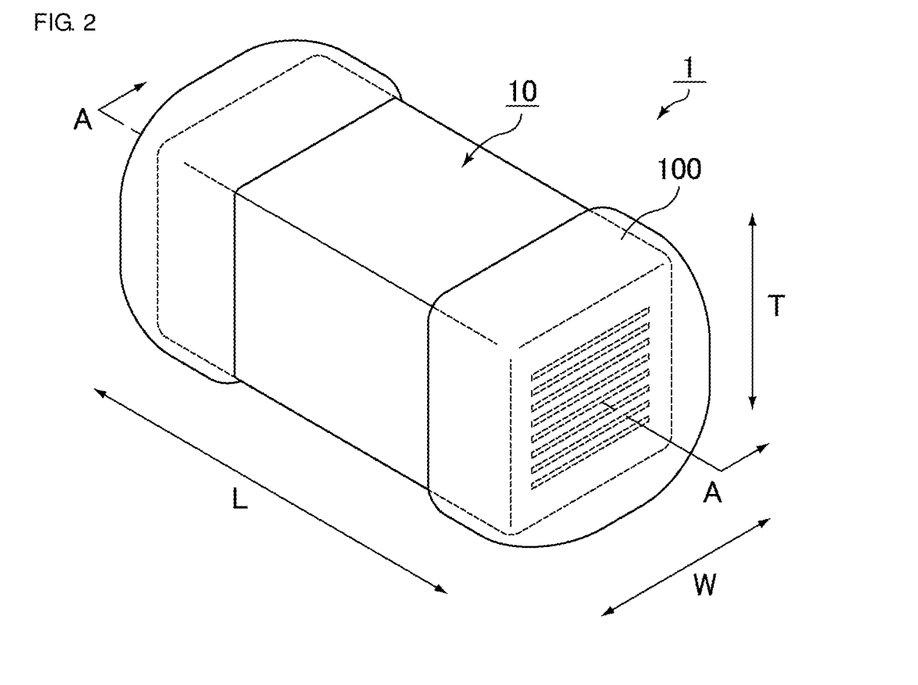
FIG. 2 is a schematic perspective view of one example of a multilayer ceramic capacitor according to a preferred embodiment of the present invention.

A multilayer ceramic capacitor according to a preferred embodiment of the present invention includes a multilayer body and a plurality of outer electrodes on some of surfaces of the multilayer body. FIG. 1 is a schematic perspective view of one example of the multilayer body of the multilayer ceramic capacitor of the present invention. FIG. 2 is a schematic perspective view of one example of a multilayer ceramic capacitor according to a preferred embodiment of the present invention. A multilayer ceramic capacitor 1 shown in FIG. 2 includes a multilayer body 10 shown in FIG. 1 and outer electrodes 100 on part of surfaces of the multilayer body 10.

In describing the multilayer ceramic capacitors and the multilayer bodies according to various preferred embodiments of the present invention, the length direction, the width direction, and the stacking direction are the directions indicated by the double headed arrows L, W, and T, respectively, shown next to the multilayer body 10 in FIG. 1 and the multilayer ceramic capacitor 1 shown in FIG. 2. The length direction, the width, direction, and the stacking direction are perpendicular or substantially perpendicular to one another. The stacking direction is the direction in which a plurality of ceramic layers 20 and a plurality of inner conductor layers 30 are stacked to define the multilayer body 10.

The multilayer body 10 preferably has a rectangular or substantially rectangular prismatic shape and has six surfaces. The six surfaces include a first main surface 11 and a second main surface 12 that face each other in the stacking direction, a first side surface 13 and a second side surface 14 that face each other in the width direction, and a first end surface 15 and a second end surface 16 that face each other in the length direction. The "substantially rectangular prismatic shape" of the multilayer body also refers to rectangular prismatic shaped with rounded corners and/or edges, and rectangular prismatic shapes having dents and protrusions on their surfaces.

The first side surface 13, the second side surface 14, the first end surface 15, and the second end surface 16 are surfaces in which the inner conductor layers may be exposed. Of these surfaces, any one surface in which the inner conductor layers are exposed may be freely designated as a first surface. When inner conductor layers are exposed in both of the first side surface 13 and the first end surface 15, one of the first side surface 13 and the first end surface 15 can be designated as the first surface. Any multilayer ceramic capacitor that includes a designated first surface that includes the features of various preferred embodiments of the present invention is within the scope of the present invention.

In this specification, a cross section of the multilayer body 10 that intersects the first end surface 15 or the second end surface 16 and extends along the stacking direction of the multilayer body 10 is referred to as an "LT cross section". A cross section of the multilayer body 10 that intersects the first side surface 13 or the second side surface 14 and extends along the stacking direction of the multilayer body 10 is referred to as a "WT cross section". A cross section of the multilayer body 10 that intersects the first side surface 13, the second side surface 14, the first end surface 15, or the second end surface 16 and extends in a direction perpendicular or substantially perpendicular to the stacking direction of the multilayer body 10 is referred to as an "LW cross section". When the first surface, which is the surface in which the inner conductor layers 30 are exposed, is the first end surface 15 or the second end surface 16, a cross section of the multilayer body 10 that intersects the first surface and extends along the stacking direction is the LT cross section. When the first surface is the first side surface 13 or the second side surface 14, a cross section of the multilayer body 10 that intersects the first surface and extends along the stacking direction is the WT cross section. A cross section of the multilayer body 10 that intersects the first surface and extends in a direction perpendicular or substantially perpendicular to the stacking direction is the LW cross section irrespective of whether the first surface is the first side surface 13, the second side surface 14, the first end surface 15, or the second end surface 16.

In the description below of this specification, preferred embodiments of the present invention are described by using an example in which the first end surface 15 is the first surface. Accordingly, in the description below, a cross section of the multilayer body that intersects the first surface and extends along the stacking direction is the LT cross section, and a cross section of the multilayer body that intersects the first surface and extends in a direction perpendicular or substantially perpendicular to the stacking direction is the LW cross section.

Preferable example dimensions of the multilayer body are as follows: about 180 μm or more and 320 μm or less in the length direction, about 90 μm or more and 160 μm or less in the width direction, and about 90 μm or more and 240 μm or less in the stacking direction.

The multilayer body 10 includes the ceramic layers 20 and the inner conductor layers 30 alternately stacked on top of one another. The average thickness of the ceramic layers 20 is preferably about 0.3 μm or more and about 1.0 μm or less, for example. Each ceramic layer 20 contains a ceramic material that contains barium titanate ($BaTiO_3$), calcium titanate ($CaTiO_3$), strontium titanate ($SrTiO_3$), or calcium zirconate ($CaZrO_3$) as a main component. Each ceramic layer 20 may contain a sub component whose content is smaller than the main component. Examples of the sub component include Mn, Mg, Si, Co, Ni, and rare earth elements.

Figure 3:
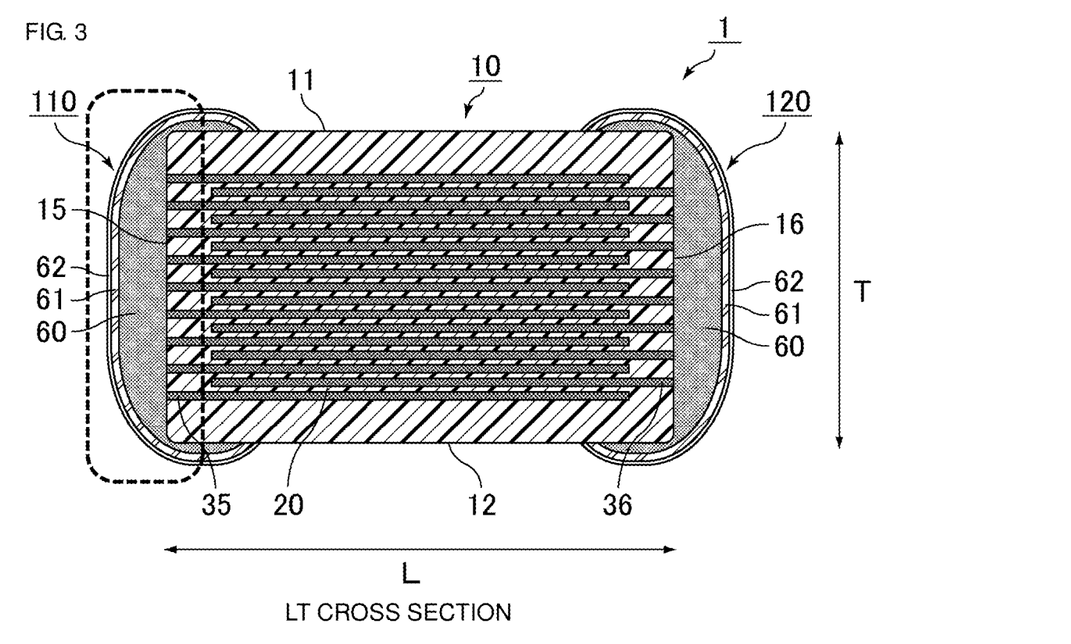
FIG. 3 is a schematic cross-sectional view of an example of an LT cross section of a multilayer ceramic capacitor according to a preferred embodiment of the present invention.

The inner conductor layers 30 include first inner conductor layers 35 and second inner conductor layers 36 that are arranged in the stacking direction. FIG. 3 is a schematic cross-sectional view of an example of an LT cross section of the multilayer ceramic capacitor according to a preferred embodiment of the present invention. FIG. 3 is taken along line A-A in FIG. 2. The first inner conductor layers 35 include portions exposed in the first end surface 15. The second inner conductor layers 36 include portions exposed in the second end surface 16. An electrostatic capacitance is generated between any one of the first inner conductor layers 35 and a second inner conductor layer 36 that surfaces this first inner conductor layer 35 with one ceramic layer 20 therebetween. The first inner conductor layer 35 that faces the second inner conductor layer 36 with one ceramic layer 20 therebetween includes a facing portion that surfaces the second inner conductor layer 36 with the ceramic layer 20 therebetween, and an extended portion extending from the facing portion to the first end surface 15 so as to be partly exposed in the first end surface 15. The second inner conductor layer 36 that faces the first inner conductor layer 35 with the ceramic layer 20 therebetween includes a facing portion that surfaces the facing portion of the first inner conductor layer 35 with the ceramic layer 20 therebetween, and an extended portion that extends from the facing portion toward the second end surface 16 so as to be partly exposed in the second end surface 16. Each of the inner conductor layers 30 preferably has a rectangular or substantially rectangular shape when viewed in plan in the stacking direction. The inner conductor layers 30 may include a first inner conductor layer 35 that does not face the second inner conductor layer 36, or a second inner conductor layer 36 that does not face the first inner conductor layer 35. In order to prevent excessive diffusion of Ni contained in the inner conductor layers 30 into base layers 60, the average thickness of the inner conductor layers 30 is preferably smaller than the average thickness of the ceramic layers 20, and is preferably, for example, about 0.2 μm or more and about 0.9 μm or less. The inner conductor layers 30 contain Ni and may further contain a metal material such as Cu, Ag, Pd, an Ag—Pd alloy, or Au.

The average thickness of the inner conductor layers 30 and the average thickness of the ceramic layers 20 are measured as follows. First, a WT cross section or an LT cross section of a multilayer body exposed by polishing is observed with a scanning electron microscope. Then a center line extending in the stacking direction and passing through the center of the cross section of the multilayer body is drawn, and then two equally spaced lines are drawn on both sides of the center line, thus drawing a total of five lines. The thickness of the layer to be measured is measured on these five lines, and the average of the five results is assumed to be the average thickness. In order to determine a more accurate average thickness, the five measurement results described above are determined from an upper portion, a center portion, and a lower portion in the stacking direction, and the average of the measurement results is assumed to be the average thickness.

Outer electrodes 100 include a first outer electrode 110 and a second outer electrode 120. The first outer electrode 110 is disposed on the first end surface 15 of the multilayer body 10, and includes portions that extend from the first end surface 15 so as to partly cover the first main surface 11, the second main surface 12, the first side surface 13, and the second side surface 14. The first outer electrode 110 is connected to the first inner conductor layers 35 at the first end surface 15. The second outer electrode 120 is disposed on the second end surface 16 of the multilayer body 10 and includes portions that extend from the second end surface 16 so as to partly cover the first main surface 11, the second main surface 12, the first side surface 13, and the second side surface 14. The second outer electrode 120 is connected to the second inner conductor layers 36 at the second end surface 16. The outer electrode 100 of the multilayer ceramic capacitor 1 according to a preferred embodiment of the present invention includes a base layer 60 that directly covers at least a portion of the first end surface 15 of the multilayer body 10 and is connected to the inner conductor layers 30. Since the outer electrode 100 that covers at least a portion of the first end surface 15 of the multilayer body 10 is the first outer electrode 110, the multilayer ceramic capacitor 1 according to a preferred embodiment of the present invention includes at least the first outer electrode 110.

The base layer 60 is a layer that contains glass and a metal. The metal contained in the base layer 60 is preferably at least one metal selected from Cu, Ni, Ag, Pd, Ag—Pd alloys, and Au, for example. The base layer 60 more preferably contains Cu. The base layer 60 preferably contains Cu and at least one metal oxide selected from oxides of Zr, Al, Ti, and Si, for example. The base layer 60 more preferably contains Zr oxide and Al oxide.

When the base layer 60 contains Cu and glass, Cu contained in the base layer 60 is preferably Cu powder. The Cu powder is preferably fine Cu powder having an average particle diameter of about 0.5 μm or more and about 2.0 μm or less, for example. When the Cu powder has a small particle diameter, the probability of the inner conductor layers 30 coming into contact with the Cu powder is increased, and the connection between the inner conductor layers 30 and the outer electrode 100 is improved.

BaO—SrO—$B_2O_3$—$SiO_2$-based glass frit (glass containing, on an oxide basis, BaO: about 10% by weight or more and 50% by weight or less, $B_2O_3$: about 3% by weight or more and 30% by weight or less, $SiO_2$: about 3% by weight or more and 30% by weight or less) is preferably used as the glass constituting the base layer 60.

The outer electrode 100 preferably includes a plating layer on the base layer 60. The plating layer preferably contains at least one metal selected from Cu, Ni, Sn, Pd, Au, Ag, Pt, Bi, and Zn, for example. The plating layer may be a single layer or may include two or more layers. As shown in FIG. 3, a Ni plating layer 61 and a Sn plating layer 62 disposed on the base layer 60 are more preferably used as the plating layer. The Ni plating layer 61 prevents water from entering the multilayer body, and the Sn plating layer 62 improves mountability of the multilayer ceramic capacitor. The average thickness of the plating layers 61 and 62 is, for example, preferably about 1 μm or more and about 15 μm or less. While the first outer electrode 110 and the second outer electrode 120 are provided as the outer electrodes 100, another outer electrode located between the first outer electrode 110 and the second outer electrode 120 may be provided as the outer electrode 100.

A multilayer ceramic capacitor according to a preferred embodiment of the present invention includes one or both of the following features (1) and (2) described below.

(1) In a cross section of the multilayer body that intersects the first surface and extends along the stacking direction, the measurement of the Ni diffusion portion taken from the first surface of the multilayer body in a direction perpendicular or substantially perpendicular to the first surface is assumed to be the diffusion depth of the Ni diffusion portion, and the measurement of the base layer taken from the first surface of the multilayer body in a direction perpendicular or substantially perpendicular to the first surface is assumed to be the thickness of the base layer. The diffusion depth of the Ni diffusion portion and the thickness of the base layer are measured on two inner conductor layers located at two ends of the multilayer body in the stacking direction (these two inner conductor layers are hereinafter also referred to as the "outermost inner conductor layers"), and the average ratio of the diffusion depth of the Ni diffusion portion to the thickness of the base layer (Ni diffusion portion diffusion depth/base layer thickness) measured on the two outermost inner conductor layers is determined. This obtained average ratio is smaller than the ratio of the diffusion depth of the Ni diffusion portion to the thickness of the base layer (Ni diffusion portion diffusion depth/base layer thickness) measured on the inner conductor layers other than the two outermost inner conductor layers.

According to a multilayer ceramic capacitor according to a preferred embodiment of the present invention having the feature (1) described above, the Ni diffusion portion diffusion depth/base layer thickness ratio is relatively small on the outermost inner conductor layers where the thickness of the base layer is small in a cross section of the multilayer body that intersects the first surface and extends along the stacking direction of the multilayer bod. Thus, the amount of hydrogen ions introduced into Ni and reaching the ceramic layers is decreased in regions on the outermost inner conductor layers where the thickness of the base layer is particularly small. Thus, the decrease in insulation resistance is prevented.

(2) In a cross section of the multilayer body that intersects the first surface and extends in a direction perpendicular or substantially perpendicular to the stacking direction, the measurement of the Ni diffusion portion taken from the first surface of the multilayer body in a direction perpendicular or substantially perpendicular to the first surface is assumed to be the diffusion depth of the Ni diffusion portion, and the measurement of the base layer taken from the first surface of the multilayer body in a direction perpendicular or substantially perpendicular to the first surface is assumed to be the thickness of the base layer. The thickness of the base layer and the diffusion depth of the Ni diffusion portion are measured on two ends, which are ends in a direction along the first surface, of an inner conductor layer closest to the cross section (hereinafter this inner conductor layer is referred to as the "closest inner conductor layer") among the inner conductor layers. The average ratio of the diffusion depth of the Ni diffusion portion to the thickness of the base layer (Ni diffusion portion diffusion depth/base layer thickness) measured on the two ends is determined. This average ratio is smaller than the ratio of the diffusion depth in Ni diffusion portion to the thickness of base layer ratio (Ni diffusion portion diffusion depth/base layer thickness) measured on a center portion of the closest inner conductor layer in a direction along the first surface.

According to a multilayer ceramic capacitor according to a preferred embodiment of the present invention having the feature (2) described above, the Ni diffusion portion diffusion depth/base layer thickness ratio is relatively small on two ends of the inner conductor layer where the thickness of the base layer is small in a cross section of the multilayer body that intersects the first surface and extends in a direction perpendicular or substantially perpendicular to the stacking direction. Thus, the amount of hydrogen ions introduced into Ni and reaching the ceramic layers is decreased on the two ends of the inner conductor layer where the thickness of the base layer is particularly small. Thus, the decrease in insulation resistance is prevented.

The decrease in insulation resistance is able to be more effectively prevented when both of the features (1) and (2) described above are satisfied, i.e., when the diffusion depth of the Ni diffusion portion is decreased and the Ni diffusion portion diffusion depth/base layer thickness ratio is decreased on the outermost inner conductor layers in a cross section of the multilayer body that intersects the first surface and extends along the stacking direction of the multilayer body and on two ends of the inner conductor layer in a cross section of the multilayer body that intersects the first surface and extends in a direction perpendicular or substantially perpendicular to the stacking direction. The features (1) and (2) will now be described in detail.

Figure 4:
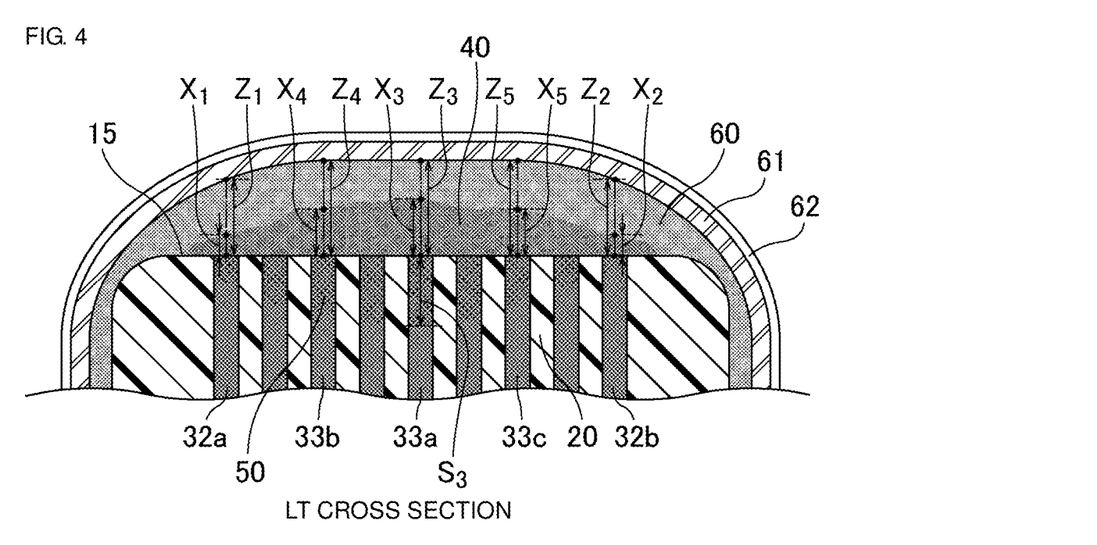
FIG. 4 is an enlarged cross-sectional view of a region near an outer electrode surrounded by a broken line in FIG. 3.
Figure 5:
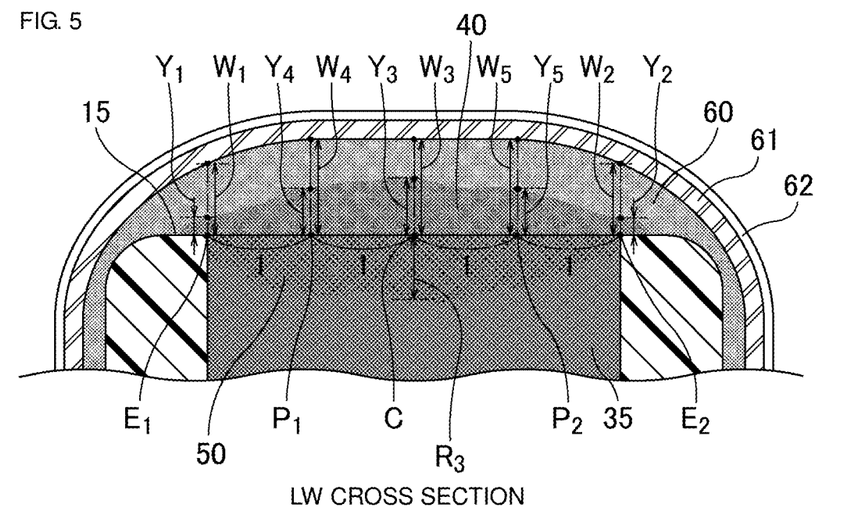
FIG. 5 is an enlarged cross-sectional view of a portion of an example of an LW cross section of a multilayer ceramic capacitor according to a preferred embodiment of the present invention.

The Ni diffusion portion formed as a result of diffusion of Ni from the inner conductor layers into the base layer is preferably a portion defined as follows (this is common to the features (1) and (2)). The diffusion depth of the Ni diffusion portion is the distance Ni atoms have diffused inside the base layer from the first surface. This distance is determined by obtaining an electron image of a cross section of a multilayer body and performing element mapping on the cross section by using an X-ray fluorescence analyzer (wavelength-dispersive X-ray spectrometer, WDX) equipped in a scanning electron microscope (SEM). Assuming that the Ni content at the interface (equivalent of the first surface of the multilayer body) between the inner conductor layer and the base layer is 100%, the portion in the base layer where the Ni content is about 25% or more is assumed to be the Ni diffusion portion. The Ni diffusion portion, which is the portion in the base layer having a Ni content of about 25% or more, is the region where hydrogen ions are easily introduced. Referring to FIGS. 4 and 5, a Ni diffusion portion 40 in the base layer 60 is indicated by superposing the hatching indicating the base layer 60 and the hatching indicating the inner conductor layers 30.

First, the feature (1) is described with reference to FIG. 4. FIG. 4 is an enlarged cross-sectional view of a region near the outer electrode surrounded by a broken line in FIG. 3. FIG. 4 schematically shows the Ni diffusion portion formed by Ni diffusing from the first inner conductor layers into the base layer.

Of the diffusion depths of the Ni diffusion portion measured, the diffusion depths of the Ni diffusion portion measured on the outermost inner conductor layers are assumed to be the Ni diffusion depths on the outermost inner conductor layers. In FIG. 4, the diffusion depths of the Ni diffusion portion 40 on outermost inner conductor layers 32a and 32b are the depths indicated by double headed arrows $X_1$ and $X_2$, respectively. The thicknesses of the base layer 60 measured on the outermost inner conductor layers 32a and 32b are indicated by double headed arrows $Z_1$ and $Z_2$, respectively. The diffusion depth of the Ni diffusion portion 40 and the thickness of the base layer 60 on the inner conductor layer 30 in a cross section of the multilayer body that intersects the first surface and extends along the stacking direction of the multilayer body 10 are measured from the center of the inner conductor layer 30 in the thickness direction (stacking direction of the multilayer body) as a starting point and are measured in a direction perpendicular or substantially perpendicular to the first end surface 15 of the multilayer body 10. The average ratio of the diffusion depth of the Ni diffusion portion to the thickness of the base layer (Ni diffusion portion diffusion depth/base layer thickness) measured on the two outermost inner conductor layers is the value indicated by formula (i) below:

$$(X_1/Z_1+X_2/Z_2)/2 \tag{i}$$

The ratio of the diffusion depth of the Ni diffusion portion 40 to the thickness of the base layer 60 measured on the inner conductor layers 30 other than the outermost inner conductor layers 32a and 32b is determined as follows. Among the inner conductor layers (inner conductor layers at the middle) other than the outermost inner conductor layers, an inner conductor layer closest to the center, an inner conductor layer closest to the midpoint between the center and one end, and an inner conductor layer closest to the midpoint between the center and the other end are selected, and the Ni diffusion depth and the thickness of the base layer are measured on each of the selected inner conductor layers as in the case of the outermost inner conductor layers. In FIG. 4, an inner conductor layer 33a is selected as the center layer, an inner conductor layer 33b is selected as the layer closest to the midpoint between the center and the left end, and an inner conductor layer 33c is selected as the layer closest to the midpoint between the center and the right end. Then the Ni diffusion depths are measured on the selected layers. The depths are indicated by double headed arrows $X_3$, $X_4$, and $X_5$, respectively. The thicknesses of the base layer 60 measured on the inner conductor layers 33a, 33b, and 33c are indicated by double headed arrows $Z_3$, $Z_4$, and $Z_5$, respectively. The ratio of the diffusion depth of the Ni diffusion portion 40 to the thickness of the base layer 60 measured on the inner conductor layers 30 other than the outermost inner conductor layers 32a and 32b is expressed by formula (ii) below:

$$(X_3/Z_3+X_4/Z_4+X_5/Z_5)/3 \tag{ii}$$

According to a multilayer ceramic capacitor of a preferred embodiment of the present invention having the feature (1) described above, the following relationship is established between formulae (i) and (ii):

$$(X_1/Z_1+X_2/Z_2)/2<(X_3/Z_3+X_4/Z_4+X_5/Z_5)/3$$

This means that, in regions on the outermost inner conductor layers 32a and 32b where the thickness of the base layer 60 is relatively small, the diffusion depth of the Ni diffusion portion 40 decreases by a larger proportion than the proportion by which the thickness of the base layer 60 decreases. For example, suppose that the thickness of the base layer 60 measured on the outermost inner conductor layers 32a and 32b is about ½ of the thickness of the base layer 60 measured in other regions. Then the diffusion depth of the Ni diffusion portion 40 measured on the outermost inner conductor layers 32a and 32b is less than about ½ of the diffusion depth of the Ni diffusion portion 40 measured in other regions. As a result, the amount of hydrogen ions introduced into Ni and reaching the ceramic layers is decreased in the regions where the thickness of the base layer 60 is particularly small, and thus the decrease in insulation resistance is prevented.

According to a multilayer ceramic capacitor according to a preferred embodiment of the present invention, the average of the diffusion depths of the Ni diffusion portion measured on the two outermost inner conductor layers in a cross section of the multilayer body that intersects the first surface and extends along the stacking direction of the multilayer body 10 is preferably smaller than the average of the diffusion depths of the Ni diffusion portion measured on the inner conductor layers other than the two outermost inner conductor layers. In other words, in FIG. 4, the relationship indicated by formula (iii) below is preferably satisfied:

$$(X_1+X_2)/2 \leq (X_3+X_4+X_5)/3 \tag{iii}$$

The average of the diffusion depths of the Ni diffusion portion measured on the two outermost inner conductor layers is preferably about 54% or less of the average of the diffusion depths of the Ni diffusion portion measured on the inner conductor layers other than the two outermost inner conductor layers. That is, in FIG. 4, the relationship indicated by formula (iv) below is preferably satisfied:

$$(X_1+X_2)/2 \leq [(X_3+X_4+X_5)/3] \times 0.54 \tag{iv}$$

When the average of the diffusion depths of the Ni diffusion portion measured on the two outermost inner conductor layers is about 54% or less of the average of the diffusion depths of the Ni diffusion portion measured on the inner conductor layers other than the two outermost inner conductor layers, the decrease in insulation resistance is more effectively prevented.

In a cross section of the multilayer body that intersects the first surface and extends along the stacking direction in a multilayer ceramic capacitor according to a preferred embodiment of the present invention, segments of the Ni diffusion portion respectively connected to the inner conductor layers are preferably connected to the adjacent segments of the Ni diffusion portion. When adjacent Ni diffusion portion segments are connected to one another and when the first end surface 15 of the multilayer body 10 is viewed in a cross section of the multilayer body that intersects the first surface and extends along the stacking direction, there are no regions between the adjacent inner conductor layers 30 where the ceramic layers 20 are in direct contact with the base layer 60 without any Ni diffusion portion 40. FIG. 4 shows a state in which all segments of the Ni diffusion portion 40 respectively connected to the inner conductor layers 30 are connected to one another. When adjacent segments of the Ni diffusion portion are connected to one another, the bondability between the outer electrode and the inner electrodes can be enhanced.

The feature (2) will now be described with reference to FIG. 5. FIG. 5 is an enlarged cross-sectional view of a portion of an example of the LW cross section of a multilayer ceramic capacitor according to a preferred embodiment of the present invention. The LW cross section of the multilayer ceramic capacitor is preferably taken so that the inner conductor layer 30 closest to the cross section is visible near the first end surface 15. In particular, the section is preferably taken at about midpoint in the stacking direction so that the inner conductor layer 30 located at the midpoint in the stacking direction is visible.

The definitions of a center portion and two ends of the inner conductor layer 30 are as follows. First, the center of the inner conductor layer 30 is a center C of a portion of the first inner conductor layer 35 shown in FIG. 5, the portion being exposed in the first end surface 15. Two ends of the inner conductor layer 30 are a left end $E_1$ and a right end $E_2$ of the first inner conductor layer 35 shown in FIG. 5. The center portion of the inner conductor layer 30 is the region from a point $P_1$, which bisects or substantially bisects the distance between $E_1$ and the center C of the portion of the multilayer body 10 exposed in the first end surface 15, to a point $P_2$, which bisects or substantially bisects the distance between C and $E_2$.

On the first inner conductor layer 35 closest to the cross section, the diffusion depths of the Ni diffusion portion 40 measured on the left end $E_1$ and the right end $E_2$ that lie along the first end surface 15 of the multilayer body 10 are indicated by double headed arrows $Y_1$ and $Y_2$, respectively. The thicknesses of the base layer 60 measured on the left end $E_1$ and the right end $E_2$, which lie along the first end surface 15 of the multilayer body 10, of the closest first inner conductor layer 35 are indicated by double headed arrows $W_1$ and $W_2$, respectively. The diffusion depth of the Ni diffusion portion 40 and the thickness of the base layer 60 in the LW cross section are measured from the first end surface of the multilayer body 10 in a direction perpendicular or substantially perpendicular to the first end surface 15. The average ratio of the diffusion depth of the Ni diffusion portion to the thickness of the base layer (Ni diffusion portion diffusion depth/base layer thickness) measured on the two ends of the inner conductor layer is indicated by formula (v) below:

$$(Y_1/W_1+Y_2/W_2)/2 \tag{v}$$

On the first inner conductor layer 35 closest to the cross section, the average of diffusion depths of the Ni diffusion portion 40 measured on the center portion along the first end surface 15 of the multilayer body 10 is the average of the diffusion depths of the Ni diffusion portion 40 measured on the points C, $P_1$, and $P_2$, i.e., the average of the depths indicated by double headed arrows $Y_3$, $Y_4$, and $Y_5$.

On the first inner conductor layer 35 closest to the cross section, the average of the thicknesses of the base layer 60 measured on the center portion along the first end surface 15 of the multilayer body 10 is the average of the thicknesses of the base layer 60 measured on the points C, $P_1$, and $P_2$, i.e., the average of the depths indicated by double headed arrows $W_3$, $W_4$, and $W_5$. The ratio of the diffusion depth of the Ni diffusion portion to the thickness of the base layer (Ni diffusion portion diffusion depth/base layer thickness) measured on the center portion is the value indicated by formula (vi) below:

$$(Y_3/W_3+Y_4/W_4+Y_5/W_5)/3 \tag{vi}$$

According to a multilayer ceramic capacitor according to a preferred embodiment of the present invention having the feature (2) described above, the following relationship is established between formulae (v) and (vi):

$$(Y_1/W_1+Y_2/W_2)/2 < (Y_3/W_3+Y_4/W_4+Y_5/W_5)/3$$

This means that, in regions on the two ends of the inner conductor layer 30 along the first end surface 15 where the thickness of the base layer 60 is relatively small, the diffusion depth of the Ni diffusion portion 40 decreases by a larger proportion than the proportion by which the thickness of the base layer 60 decreases. For example, suppose that the thicknesses of the base layer 60 measured on the two ends of the inner conductor layer 30 along the first end surface 15 are each about ½ of the thickness of the base layer 60 measured on the center portion. Then the diffusion depth of the Ni diffusion portion 40 measured on the two ends are each less than about ½ of the diffusion depth of the Ni diffusion portion 40 measured on the center portion. As a result, the amount of hydrogen ions introduced into Ni and reaching the ceramic layers is decreased in regions where the thickness of the base layer 60 is particularly small, and thus the decrease in insulation resistance is prevented.

According to a multilayer ceramic capacitor according to a preferred embodiment of the present invention, in a cross section of the multilayer body that intersects the first surface and extends in a direction perpendicular or substantially perpendicular to the stacking direction, the average of the diffusion depths of the Ni diffusion portion measured on the two ends, which are ends in a direction along the first surface, of the inner conductor layer closest to the cross section among the inner conductor layers is preferably smaller than the diffusion depth of the Ni diffusion portion measured on the center portion, which is a center portion in a direction along the first surface, of the closest inner conductor layer. In other words, in FIG. 5, the relationship indicated by formula (vii) below is preferably satisfied:

$$(Y_1+Y_2)/2<Y_3 \qquad \text{(vii)}$$

The average diffusion depth of the Ni diffusion portion measured on two ends, which lie in a direction along the first surface, of the inner conductor layer closest to the cross section is preferably about 54% or less of the diffusion depth of the Ni diffusion portion measured on the center portion, which is a center portion in a direction along the first surface, of the closest inner conductor layer. That is, in FIG. 5, the relationship indicated by formula (viii) below is preferably satisfied:

$$(Y_1+Y_2)/2 \leq Y_3 \times 0.54 \qquad \text{(viii)}$$

When the average diffusion depth of the Ni diffusion portion measured on two ends, which lie in a direction along the first surface, of the inner conductor layer closest to the cross section is about 54% or less of the diffusion depth of the Ni diffusion portion measured on the center portion, which is a center portion in a direction along the first surface, of the closest inner conductor layer, the decrease in insulation resistance is more effectively prevented.

The maximum diffusion depth of the Ni diffusion portion of the multilayer ceramic capacitor of the present invention having the feature (1) or (2) is preferably about 2.5% or more and about 33.3% or less of the maximum thickness of the base layer. When the maximum diffusion depth of the Ni diffusion portion is about 2.5% or more of the maximum thickness of the base layer, the bonding strength between the outer electrode and the inner conductor layers is increased. When the maximum diffusion depth of the Ni diffusion portion is about 33.3% or less of the maximum thickness of the base layer, introduction of hydrogen ions is reduced. In both the LT cross section and the LW cross section, the position at which the diffusion depth of the Ni diffusion portion 40 is largest and the position at which the thickness of the base layer 60 is largest are typically in the center portion of the first end surface 15 of the multilayer body 10. In other words, this position is the position of the inner conductor layer 33a in FIG. 4, and the position of the point C in FIG. 5. If the diffusion depth of the Ni diffusion portion and the thickness of the base layer are largest in the center portion of the first surface, the ratio of the diffusion depth of the Ni diffusion portion to the thickness of the base layer may be determined at that position. If the position at which the diffusion depth of the Ni diffusion portion is largest is different from the position at which the thickness of the base layer is largest, the diffusion depth of the Ni diffusion portion and the thickness of the base layer may be measured at the respective positions and then the ratio of the diffusion depth to the thickness may be determined.

A base layer of a multilayer ceramic capacitor according to a preferred embodiment of the present invention having the feature (1) or (2) preferably contains Cu, and each of the inner conductor layers preferably has a Cu diffusion portion in contact with the base layer. When there is a Cu diffusion portion, introduction of hydrogen ions is significantly reduced or prevented, and the bondability between the outer electrode and the inner conductor layers is increased. The Cu diffusion portion is formed by Cu diffusing from the base layer into the inner conductor layer and is preferably defined as follows. The diffusion depth of the Cu diffusion portion is the depth in which Cu atoms have diffused into the inner conductor layer, measured from the first surface of the multilayer body in a direction perpendicular or substantially perpendicular to the first surface. The depth is measured by obtaining an electron image of a cross section of the multilayer body and performing element mapping on the cross section by using an X-ray fluorescence analyzer (wavelength-dispersive X-ray spectrometer, WDX) equipped in a scanning electron microscope (SEM). Assuming that the Cu content at the interface (equivalent of the first surface of the multilayer body) between the inner conductor layer and the base layer is 100%, any portion in the inner conductor layer where the Cu content is about 25% or more is defined to be the Cu diffusion portion, for example. The Cu diffusion portion, which is the portion in the inner conductor layer where the Cu content is about 25% or more, is the region defined as a portion where the bondability between the outer electrode and the inner conductor layer is increased.

In FIGS. 4 and 5, a Cu diffusion portion 50 in each inner conductor layer 30 is indicated by superposing the hatching indicating the base layer 60 and the hatching indicating the inner conductor layer 30. The diffusion depth of the Cu diffusion portion 50 is either the depth of the Cu diffusion portion 50 measured from the first end surface 15 of the multilayer body 10 in a direction perpendicular or substantially perpendicular to the first end surface 15 in the LT cross section or the depth of the Cu diffusion portion 50 measured from the first end surface 15 of the multilayer body 10 in a direction perpendicular or substantially perpendicular to the first end surface 15 in the LW cross section. The diffusion depth of the Ni diffusion portion 40 measured on one inner conductor layer 30 is preferably smaller than the diffusion depth of the Cu diffusion portion 50 in that inner conductor layer 30. For example, referring to FIG. 4, the diffusion depth $X_3$ of the Ni diffusion portion 40 in the inner conductor layer 33a is preferably smaller than the measurement $S_3$ indicated by the double headed arrow indicating the diffusion depth of the Cu diffusion portion 50 of the inner conductor layer 33a. Referring to FIG. 5, the diffusion depth $Y_3$ of the Ni diffusion portion 40 at the point C is preferably smaller than the measurement $R_3$ indicated by the double headed arrow indicating the diffusion depth of the Cu diffusion portion 50 at the point C.

The diffusion depth of the Cu diffusion portion in the inner conductor layer is preferably about 0.5 μm or more and about 5 μm or less, for example. When the diffusion depth of the Cu diffusion portion in the inner conductor layer is about 0.5 μm or more, degradation in conduction reliability between the inner conductor layer and the outer electrode is prevented. Moreover, it becomes possible to prevent a decrease in electrostatic capacitance caused by disconnection between the inner conductor layer and the outer electrode due to repeated voltage application and discharging. When the diffusion depth of the Cu diffusion portion of the inner conductor layer is about 5 μm or less, the thickness of the inner conductor layer is not excessively large and internal stress does not excessively accumulate in the multilayer body with exposed inner conductor layers. As a result, the multilayer body is prevented from cracking.

The Cu diffusion portion of the inner conductor layer preferably includes a Cu oxide portion. The Cu oxide portion prevents undesirable spreading of the Cu diffusion portion. The presence of the Cu oxide portion can be confirmed under the same conditions as those for WDX described above.

The diffusion depth of the Ni diffusion portion is preferably about 2.5% or more of the thickness of the base layer, for example. When the diffusion depth of the Ni diffusion portion is about 2.5% or more of the thickness of the base layer, a decrease in conduction reliability between the inner conductor layer and the outer electrode is prevented. Moreover, it becomes possible to prevent a decrease in electrostatic capacitance caused by disconnection between the inner conductor layer and the outer electrode due to repeated voltage application and discharging.

A non-limiting example of a method for making a multilayer ceramic capacitor according to a preferred embodiment of the present invention will now be described. A ceramic slurry containing a ceramic, an organic substance, a solvent, etc., is applied to a carrier film by printing, spray-coating, die-coating, or any other suitable process into a sheet shape so as to obtain a ceramic sheet. The ceramic sheet contains the ceramic, the organic substance, and the residual solvent. A conductive film that will form an inner conductor layer is formed on the ceramic sheet by screen-printing, gravure-printing, or any other suitable process. A plurality of ceramic sheets with conductive films formed thereon are prepared and stacked to form a sheet stack. The sheet stack is shaped by being pressed by rigid-body pressing, isostatic pressing, or any other suitable process so as to obtain a laminated block. The laminated block is divided into a plurality of chips through press-cutting, dicing, or any other suitable process. The chips are baked under prescribed conditions so as to form multilayer bodies that constitute portions of the multilayer ceramic capacitors. A conductive paste that will form a portion of outer electrodes is applied to some of surfaces of each multilayer body by, for example, a dipping method. The multilayer body with the conductive paste applied thereto is baked. As a result, the conductive paste forms a base layer which constitutes a portion of the outer electrode. Then a plating process is conducted to form a plating layer on the base layer. Through these steps, a multilayer ceramic capacitor, which is a ceramic electronic component, can be manufactured.

In a multilayer ceramic capacitor according to a preferred embodiment of the present invention, the diffusion depth of the Ni diffusion portion is controlled. The diffusion depth of the Ni diffusion portion is able to be controlled by adjusting the baking conditions used in baking the multilayer body with the conductive paste applied thereto. The peak temperature in baking the multilayer body with the conductive paste applied thereto is preferably about 700° C. or higher and about 900° C. or lower, for example. The peak temperature is held for a particular time. While the peak temperature is maintained, water (water vapor) is added to the baking atmosphere. When water is added in the later stage of the period during which the peak temperature is maintained, metal interdiffusion is significantly reduced or prevented. The reason for this is presumably the progress of oxidation of the metals that respectively constitute the inner conductor layers and the outer electrodes. When water is added to the baking atmosphere, oxidation of metal is promoted in the regions where the thickness of the base layer is small, and thus diffusion of Ni is particularly significantly reduced or prevented in the regions where the thickness of the base layer is small.

When the method of adding water to suppress metal interdiffusion is used, fine Cu powder having an average particle diameter of about 0.5 µm or more and about 2.0 µm or less is preferably used as the material for the base layer, for example. When fine Cu powder is used, the probability of the inner conductor layers coming into contact with the Cu powder is increased, and the connection between the inner conductor layers and the outer electrodes is able to be improved. Thus, adding water suppresses disconnection between the inner conductor layers and the outer electrodes.

Diffusion of Ni is also able to be significantly reduced or prevented by decreasing the thickness of the outermost inner conductor layers or decreasing the Ni content of the inner conductor layers.

In order to increase bondability between the outer electrodes and the inner conductor layers, the average particle diameter of the Cu powder in the conductive paste is preferably smaller than the average particle diameter of glass in the conductive paste. In the solid component including the Cu powder and the glass, the ratio of the volume of the Cu powder to the volume of the glass is preferably 2 or more, for example.

According to an existing method, water cannot be added during the later stage of the period during which the peak temperature is maintained. This is because adding water increases flowability of the glass contained in the base layer and the flowing glass disrupts the bonds between the outer electrodes and the inner conductor layers. However, when fine Cu powder having an average particle diameter of about 0.5 µm or more and about 2.0 µm or less is used, bonding between the outer electrodes and the inner conductor layers during the early stage of baking is strengthened, and the bonds between the outer electrodes and the inner conductor layers are likely to remain unbroken even when water is added during the later stage of the period during which the peak temperature is maintained. Due to this finding, it has become possible to control the diffusion depth of the Ni diffusion portion while securing the bonds between the outer electrodes and the inner conductor layers in various preferred embodiments of the present invention.

A preferable example method of a method for making a multilayer ceramic capacitor according to a preferred embodiment of the present invention by suppressing diffusion of Ni includes a step of applying a conductive paste containing Cu powder to a first surface of a multilayer body that includes a plurality of ceramic layers and a plurality of inner conductor layers arranged in a stacking direction, the first surface being a surface in which the inner conductor layers are exposed; and a step of baking the conductive paste applied to the first surface. The Cu powder used in a method for making a multilayer ceramic capacitor according to a preferred embodiment of the present invention has an average particle diameter of about 0.5 µm or more and about 2.0 µm or less. In the step of baking the conductive paste, water is added to the baking atmosphere while the peak temperature is maintained.

EXAMPLES

Multilayer ceramic capacitors according to preferred embodiments of the present invention are more specifically described below through Examples which do not limit the scope of the present invention.

Examples 1 to 3

1) Preparation of Multilayer Ceramic Capacitor

To a ceramic material, $BaTiO_3$, a polyvinyl butyral-based binder, a plasticizer, and an organic solvent, namely, ethanol, were added. The resulting mixture was wet-mixed in a ball mill to prepare a ceramic slurry. The ceramic slurry was formed into sheets by a lip technique to obtain rectangular ceramic green sheets. A conductive paste containing Ni was applied to the ceramic green sheets by screen-printing so as to form conductive films that would form inner conductor layers containing Ni as a main component. The ceramic green sheets with the conductive films formed thereon were stacked so that the side to which the conductive films were extended alternated so as to obtain a green sheet stack that would form a capacitor body. The green sheet stack was pressure-shaped and divided into chips through dicing. The obtained chips were heated in a $N_2$ atmosphere to burn away the binder, and then baked in a reducing atmosphere containing $H_2$, $N_2$, and $H_2O$ gas so as to obtain a sintered multilayer bodies. Each of the sintered multilayer bodies was formed of ceramic layers and inner conductor layers.

2) Preparation of Conductive Paste for Forming Base Layers

A conductive paste containing glass frit and Cu powder having an average particle diameter of about 0.5 µm or more and 2 µm or less was prepared as the conductive paste for forming base layers. The details of the conductive paste were as follows:

Solid component content: about 25 vol %
Ratio of Cu powder in solid component: about 67.5 vol %
Ratio of glass in solid component: about 32.5 vol %
Composition of glass: $BaO$—$SrO$—$B_2O_3$—$SiO_2$-based glass frit (glass containing, on an oxide basis, BaO: about 10% by weight or more and 50% by weight or less, $B_2O_3$: about 3% by weight or more and 30% by weight or less, $SiO_2$: about 3% by weight or more and 30% by weight or less)

3) Formation of Base Layers of Outer Electrodes by Baking Process

The conductive paste described above was applied to some of surfaces of the multilayer body and the applied conductive paste was baked. Water was added to the baking atmosphere at a peak temperature. Base layers of outer electrodes were formed by this baking process. The amount of water added was set at three levels, high, medium, and low, within the range of about 1 cc/min or more and about 6 cc/min or less. Then a plating process was conducted on the base layers so as to form Ni plating layers and Sn plating layers on the base layers. As a result, a multilayer ceramic capacitor was obtained.

The intended outer dimensions of the multilayer ceramic capacitor obtained as above were about 125 µm in width, about 250 µm in length, and about 125 µm in height (measurement in the stacking direction). The thickness of each ceramic layer sandwiched between the inner conductor layers was about 1.0 µm, and the thickness of each inner conductor layer was about 0.6 µm. The number of effective ceramic layers was about 50 or less. The maximum thickness of the base layers of the outer electrodes was about 8 µm to about 12 µm, and the thickness of the Ni plating layer and the thickness of the Sn plating layer were each about 3.5 µm.

Comparative Examples 1 to 3

In Comparative Example 1, a multilayer ceramic capacitor was prepared as in Example 1 except that Cu powder having an average particle diameter of about 2.5 µm or more and about 4 µm or less was used to form the conductive paste for forming the base layer and that water was not added during the baking process for forming the base layers of the outer electrodes. In Comparative Example 2, a multilayer ceramic capacitor was prepared as in Example 1 except that Cu powder having an average particle diameter of about 2.5 µm or more and about 4 µm or less was used to form the conductive paste for forming the base layers. In Comparative Example 3, a multilayer ceramic capacitor was prepared as in Example 1 except that water was not added during the baking process for forming the base layers of the outer electrodes.

Evaluation of Characteristics

The multilayer ceramic capacitors prepared in Examples and Comparative Examples were subjected to the following evaluation.

Capacitance Evaluation Test

The capacitance of each multilayer ceramic capacitor was determined by using a capacitance meter at a measurement voltage of about 0.5 Vrms and a measurement frequency of 1 kHz. Samples that had a capacitance within about ±10% of the intended capacitance were rated good, and other samples were rated poor.

Moisture Resistance Test

Only the samples rated good in the capacitance evaluation test were subjected to a moisture resistance test. In the moisture resistance test, the multilayer ceramic capacitor was mounted on a substrate and subjected to a wet-load lifetime test at an ambient temperature of about 125° C. and a relative humidity of about 95% RH under application of about 3.2 V of DC voltage. After about 72 hours of testing, the decrease in insulation resistance log (IR) excluding the decrease in insulation resistance attributable to the substrate was measured. The samples in which no decrease in insulation resistance was observed were rated excellent, the samples in which the insulation resistance decreased but insulation resistance log (IR) was equal to or greater than about 7.5 were rated good, and samples in which the insulation resistance log (IR) was less than about 7.5 were rated poor.

Measurement of Diffusion Depth of Ni Diffusion Portion

The multilayer ceramic capacitors prepared in Examples 1 to 3 and Comparative Example 3, which were rated good in the capacitance evaluation test and subjected to the humidity resistance test, were processed so as to expose an LT cross section that passes through the center of the multilayer body, and the diffusion depth of the Ni diffusion portion was measured by the following procedure. First, the exposed LT cross section was subjected to flat milling at about 3 kV/5 min/60° and coated with carbon (C). Then an electron image of the LT cross section was obtained with a scanning electron microscope (SEM), and an electron map of the LT cross section was obtained by using an X-ray florescence analyzer (wavelength-dispersive X-ray spectrometer, WDX) equipped in the scanning electron microscope (SEM). The SEM/WDX observation conditions were as follows:

Acceleration voltage: about 15.0 kV

Illumination current: about $5 \times 10^{-8}$ A

Magnification: about 2000 layers, the inner conductor layer closest to the midpoint between the center and one end, and the inner conductor layer closest to the midpoint between the center and the other end. Then the average ratio of the diffusion depth of the Ni diffusion portion to the thickness of the base layer was calculated. The results are indicated in the "center inner conductor layer" column in Table 1. The test results are also summarized in Table 1. Cu powder having an average particle diameter of about 2.5 μm or more and about 4 μm or less is designated as "large", and Cu powder having an average particle diameter of about 0.5 μm or more and about 2 μm or less is designated as "small".

TABLE 1

| | Average particle diameter of Cu powder | Addition of water | Capacitance evaluation | Moisture resistance evaluation | Diffusion depth of Ni diffusion portion (μm) | | Ni diffusion portion diffusion depth/base layer thickness | |
|---|---|---|---|---|---|---|---|---|
| | | | | | Center inner conductor layer | Outermost inner conductor layer | Center inner conductor layer | Outermost inner conductor layer |
| Example 1 | Small | High | Good | Excellent | 4.3 | 2.7 | 38% | 28% |
| Example 2 | Small | Medium | Good | Excellent | 4.8 | 4.1 | 54% | 48% |
| Example 3 | Small | Low | Good | Good | 5.5 | 5.2 | 59% | 55% |
| Comparative Example 1 | Large | None | Poor | — | — | — | — | — |
| Comparative Example 2 | Large | High | Poor | — | — | — | — | — |
| Comparative Example 3 | Small | None | Good | Poor | 5.4 | 5.0 | 64% | 66% |

Dwell time (the time the beam dwells on each pixel): about 40 ms

Analysis depth (reference): about 1 to 2 μm

Figure 6:
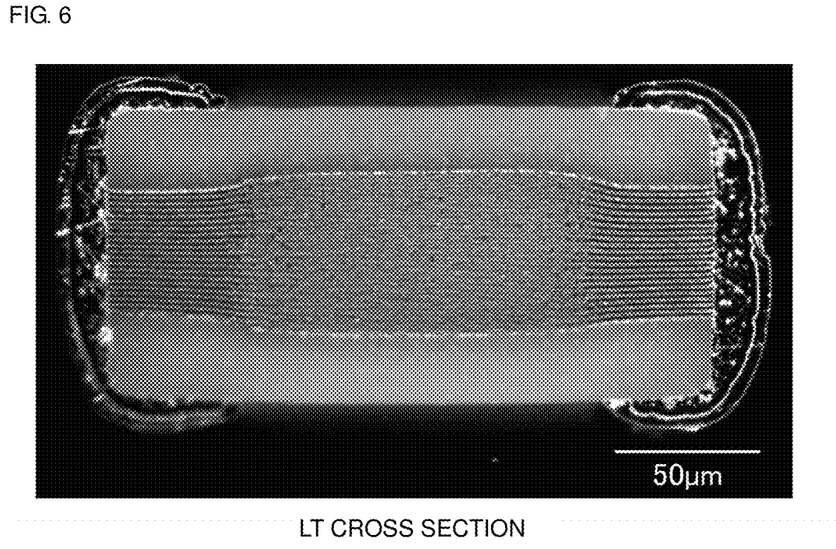
FIG. 6 is an electron image of an LT cross section obtained from a multilayer ceramic capacitor of Example 1 by using an optical microscope.
Figure 7:
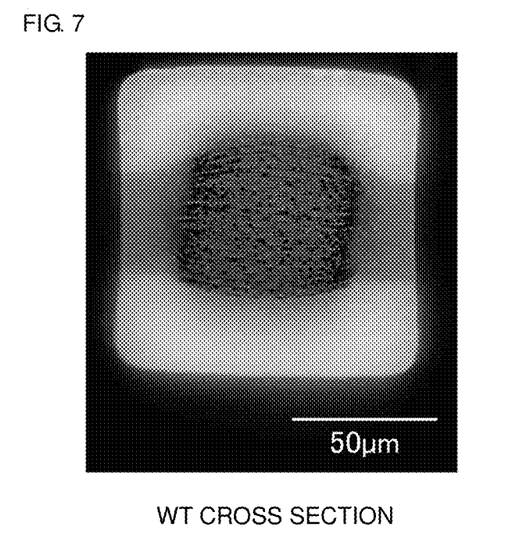
FIG. 7 is an electron image of a WT cross section obtained from the multilayer ceramic capacitor of Example 1 by using an optical microscope.
Figure 8:
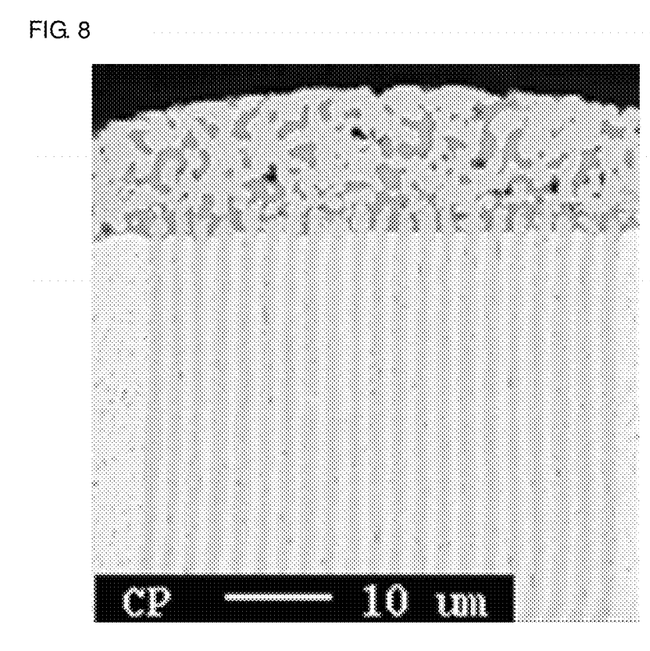
FIG. 8 is an electron image enlarging a region near a first surface of the multilayer body obtained by observing the LT cross section of the multilayer ceramic capacitor shown in FIG. 6 with a scanning electron microscope (SEM).
Figure 9:
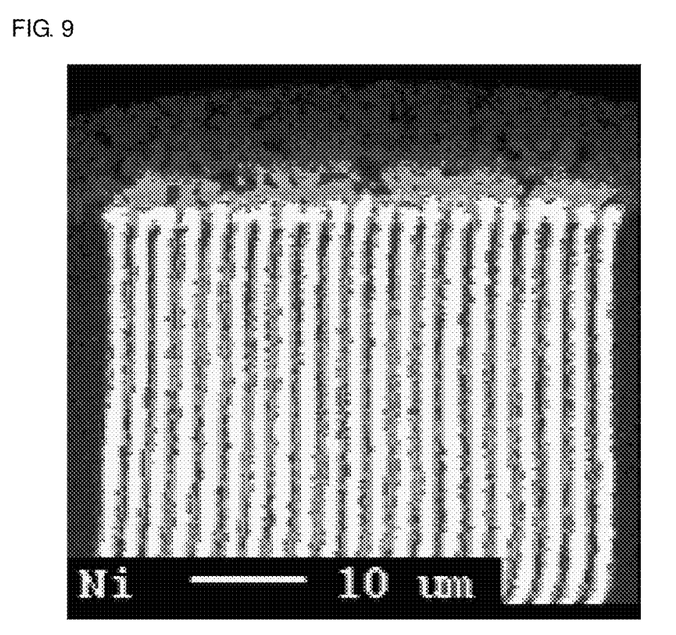
FIG. 9 is a diagram showing Ni atom mapping results of the electron image shown in FIG. 8.

FIG. 6 is an electron image of an LT cross section obtained from the multilayer ceramic capacitor of Example 1 by using an optical microscope. FIG. 7 is an electron image of the WT cross section of the same multilayer ceramic capacitor. FIG. 8 is an electron image enlarging the region near the first surface of the multilayer body obtained by observing the LT cross section of the multilayer ceramic capacitor shown in FIG. 6 with a scanning electron microscope (SEM). FIG. 9 is a diagram showing the Ni atom mapping results of the electron image shown in FIG. 8. The multilayer ceramic capacitor shown in FIGS. 8 and 9 is the multilayer ceramic capacitor before formation of the Ni plating layers and the Sn plating layers on the multilayer body, in other words, after formation of base layers.

From the element map of the LT cross section, the Ni diffusion depth and the thickness of the base layer were measured on the two outermost inner conductor layers according to the procedure previously described with reference to FIG. 4, and the average of the Ni diffusion portion diffusion depth/base layer thickness ratios was calculated. The value is indicated under the "outermost inner conductor layer" column in Table 1. In the element map of the LT cross section, the procedure previously described with reference to FIG. 4 was performed to measure the diffusion depths of the Ni diffusion portion and the thicknesses of the base layer on the inner conductor layer closest to the center among the inner conductor layers (inner conductor layers located in the center portion) other than the two outermost inner conductor As shown in Table 1, in the multilayer ceramic capacitors of Examples 1 and 2, the diffusion depth of the Ni diffusion portion measured on the outermost inner conductor layers was controlled to be smaller, and the Ni diffusion portion diffusion depth/base layer thickness ratio measured on the outermost inner conductor layers was accordingly smaller than that measured on the center inner conductor layer. The multilayer ceramic capacitors also exhibited the most favorable results in the capacitance evaluation and moisture resistance evaluation. In Example 3 also, favorable results were obtained in the capacitance evaluation and humidity resistance evaluation.

While preferred embodiments of the present invention have been described above, it is to be understood that variations and modifications will be apparent to those skilled in the art without departing from the scope and spirit of the present invention. The scope of the present invention, therefore, is to be determined solely by the following claims

What is claimed is:

1. A method for making a multilayer ceramic capacitor, the method comprising:
   a step of applying a conductive paste containing Cu powder to a first surface of a multilayer body that includes a plurality of ceramic layers and a plurality of inner conductor layers arranged in a stacking direction, the inner conductor layers being exposed at the first surface; and
   a step of baking the conductive paste on the first surface; wherein
   the Cu powder has an average particle diameter of about 0.5 μm or more and about 2.0 μm or less; and in the step of baking the conductive paste, water is added to a baking atmosphere while a peak temperature is maintained.

2. The method for making a multilayer ceramic capacitor according to claim 1, wherein, in the step of baking the conductive paste, water is added in a later stage of a period during which the peak temperature is maintained.

3. The method for making a multilayer ceramic capacitor according to claim 1, wherein the conductive paste further contains glass, and the average particle diameter of the Cu powder is smaller than an average particle diameter of the glass.

* * * * *